J. R. BOULDIN.
DRAFT EQUALIZER.
APPLICATION FILED JAN. 18, 1907.
926,542.
Patented June 29, 1909.
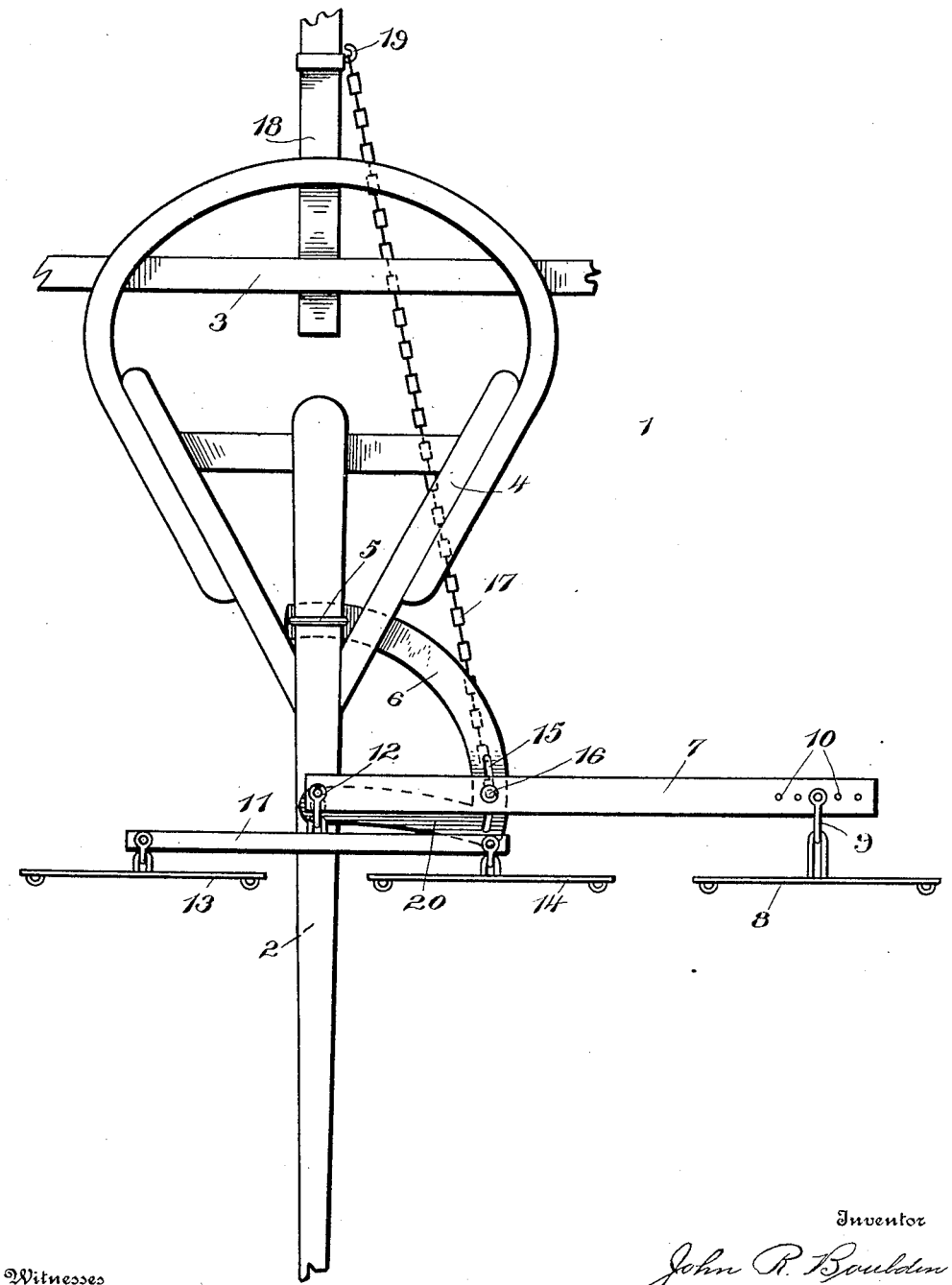
Witnesses
J. P. Britt
E. C. Duffy
Inventor
John R. Bouldin
By O. E. Duppra
Attorneys

UNITED STATES PATENT OFFICE.

JOHN R. BOULDIN, OF CHANNING, TEXAS.

DRAFT-EQUALIZER.

No. 926,542.  Specification of Letters Patent.  Patented June 29, 1909.

Application filed January 18, 1907. Serial No. 352,905.

*To all whom it may concern:*

Be it known that I, JOHN R. BOULDIN, citizen of the United States, residing at Channing, in the county of Hartley and State of Texas, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to wagons and vehicles, but more particularly to the class of "draft equalizers," and has for its object primarily to provide a device of this class in which there is no side draft, and at the same time to provide a construction which is particularly simple in its construction, strong and durable.

With this object in view, my invention consists in the novel construction of the device and in certain combinations of parts which will be first fully described and afterward specifically pointed out in the appended claim.

Referring to the accompanying drawing: the figure represents a top plan of the draft equalizer.

Referring to the drawing by reference numerals, 1 indicates the device, 2 the tongue and 3 the forward axle and 4 the hounds. Secured to the tongue by a clevis 5 is the segmental draft support 6, to which the triple tree 7 is pivoted as shown. The pivotal point of said triple tree is located at a distance from the inner end of said tree equal to one third the length of said tree. To the outer end of the triple tree is the whiffle tree 8 secured to said tree by a clevis 9, the outer portion of said triple tree being provided with a series of holes 10 so as to admit adjustment of the said whiffle tree 8, for a purpose which will be hereinafter fully described.

11 indicates the double tree which is connected to the triple tree by means of a clevis 12, and secured to said double tree are the whiffle trees 13 and 14.

As shown the segmental draft support 6 is slotted at 15 to receive the bolt or clevis 16.

17 indicates a draft chain which passes under the hounds and is secured to the pivotal bolt or clevis 16 of the triple tree at one end and connected to the reach pole 18 by means of a hook 19 or other suitable connecting means.

Having thus described the several parts of my invention, its operation is as follows: If necessary in order to properly equalize the draft of the three horses the whiffle tree 8 can be adjusted on the triple tree by means of the holes in said triple tree, which allows the clevis of the whiffle tree to be moved one way or the other in order to increase or diminish the leverage. The triple tree is held or supported in position by the segmental draft support 6, said support being provided with a bracing arm 20 secured to the tongue 2. The draft, however, is taken up by the draft chain 17 and as the draft of the three horses is centered at the pivotal point of the triple tree, and said pivotal point being to one side of the pole there would be a side draft but for the particular arrangement of the draft chain 17. As the draft of the horses on the draft chain 17 is to one side of the pole, and as the draft on the draft chain is communicated to the reach pole 18 there is no tendency to pull the forward axle to one side or occasion a side draft thereon, as the forward wheel or axle is not influenced by the draft on the reach pole.

Referring again to the segmental draft support 6, it will be seen that this form allows the slot 15 to lie substantially parallel with the tongue 2 and on an arc, the radius of which is equal to the distance of the slot from the center of the tongue 2, in order to allow sufficient longitudinal movement of the triple tree 7 to insure the entire draft being taken up by the draft chain and to allow the tongue 2 to swing freely without binding on the draft chain 17.

Having thus fully described my invention, I do not wish to be understood as limiting myself to the exact construction herein set forth, as various slight changes may be made therein which would fall within the limit and scope of my invention, and I consider myself clearly entitled to all such changes and modifications.

What I claim as my invention and desire to secure by Letters Patent of the United States is:—

A draft equalizer adapted to be secured to the tongue of a vehicle, said equalizer comprising a segmental draft support, said segmental draft support being adapted to be rigidly secured to the vehicle tongue, a triple tree, a bolt for said triple tree, said segmental draft support being provided with a slot through which said bolt passes in such manner that said bolt and triple tree are capable of longitudinal movement relatively to the said draft support, said slot lying substantially parallel with the vehicle tongue when the equalizer is attached thereto, a draft chain passing from said triple tree for connection with the reach pole of a vehicle.

In testimony whereof, I affix my signature, in presence of two witnesses.

JOHN R. BOULDIN.

Witnesses:
R. O. NEELY,
E. F. BATTE.